April 11, 1961   W. R. WOODALL   2,979,100
TIRE CONSTRUCTION
Filed April 17, 1957

INVENTOR.
WILLIAM R. WOODALL
BY
W. A. Fraser
ATTY.

United States Patent Office 2,979,100
Patented Apr. 11, 1961

2,979,100

TIRE CONSTRUCTION

William R. Woodall, Akron, Ohio, assignor to The Firestone Tire & Rubber Company, Akron, Ohio, a corporation of Ohio Filed Apr. 17, 1957, Ser. No. 653,320

1 Claim. (Cl. 152—354)

This invention relates to pneumatic tires and particularly to pneumatic tire constructions providing improved ride characteristics.

In recent years, as automobiles have become quiter in operation and as the road surfaces have become smoother, many pneumatic tires have been observed to have an objectionable ride characteristic referred to as "thump." A thumping tire transmits a periodic impulse to an automobile which at certain speeds will strike a resonance in a panel or other member of the automobile and will thereby be amplified to the point where it is annoying and objectionable.

At one time it was thought that thump was due to an out-of-balance condition of a tire, but perfectly balanced tires have been found to thump. It has been thought too that the presence of irregularities in the tire construction such as heavy body ply or tread splices, or out-of-round conditions would cause thump; yet, tires, which upon inspection are of sound construction, still exhibit this defect.

The present invention has turned away from all such conventional theories of thump and has found that if the cords of an otherwise sound tire are uniformly tensioned, thump does not occur. Hence, before discussing the solution to this problem as it is embodied in the present invention, it may be well to consider the problem of cord tension and the manner in which variations in cord tension produce thump.

As a tire rolls along a pavement, the cords of the body plies of the tire pass successively through the so-called "footprint" of the tire, the footprint being the area of contact which the tire makes with the road. The cords, just before entering the footprint, are under longitudinal tension as induced by the inflationary air pressure within the tire. As the cords enter the footprint, they lose their tension, and they remain free from tension so long as they remain in the footprint. Immediately after the cords leave the footprint they assume the same tension they had before. This resumption of a condition of tension occurs with a "snap" and when the cords snap into tension they impart rapidly successive shocks to the bead of the tire which are transmitted from the tire to the vehicle itself. Such shocks are imparted uniformly to the wheel if the cords are under uniform tension. However, if the cord tensions in a portion of a body ply or plies is substantially different from the tension in the remainder of the cords, there will be a series of distinctly different shocks imparted to the wheel periodically as such portion enters and leaves the footprint.

Consider, for example, the effect of a portion of a body ply extending over about 10° of arc and having a tension 20% greater than the remainder of the body plies. As such a portion leaves the footprint, the cords will snap outwardly into distended position with greater force than the cords extending over the remaining 350° of arc, and the shocks imparted to the vehicle wheel by this portion will be of consequently greater force. Thus each time such a portion passes through the footprint, a disturbance will be transmitted to the vehicle, a disturbance which manifests itself as "thump."

The present invention solves this problem of the variation in cord tension around the periphery of the tire and the attendant problem of thump, by introducing elements into the tire which act as cord-tension regulators and which permit the cords having excess tension to relieve themselves of a major portion of such extra tension. Preferably such tension-regulating elements comprise relatively soft, yieldable members which support the cord in such a manner that the highly stressed cords "bite" deeply into the members and in this fashion relieve themselves of some of the loads and tensions which they would otherwise bear while the cords which are less highly stressed bite into the members to a lesser degree and their tension is relieved to a much less extent. Such yieldable supporting members thus permit an automatic adjustment of the cord tensions in accordance with the degree of such tensions and as a result of such adjustment, the cord tensions become fairly uniform.

In the preferred form of the invention, the tension-regulating elements comprise rings of soft rubber built into the crown of the tire and underlying the body plies respectively, so that the cords of each of the body plies have bearing contact against the rings. The cords, because they are under tension, tend to pull inwardly upon the soft rings and those cords which are under the higher tensions will pull inwardly upon the rings to a greater extent than the cords having lesser tensions. The highly tensioned cords thus tend to be relieved of their excess tensions.

It is accordingly a general object of the invention to provide a pneumatic tire having improved ride characteristics.

A further object is to provide a pneumatic tire which is free from the objectionable ride characteristic which is termed "thump" by present-day tire engineers.

A more specific object is to provide a pneumatic tire construction in which the body plies have a limited freedom to pull inwardly and shorten their lengths under tension.

A further object is to provide means whereby the shocks caused by the changes in tension in the cords of the body plies of the tire as such cords pass through the footprint of the tire are effectively cushioned before they are transmitted to the vehicle.

Another object is to provide means which will eliminate thump in a tire without adding to the difficulty or expense of manufacture and without detracting from the performance of the tire in other respects.

These and further objects and advantages will be apparent from the following description of several forms of the invention, reference being had to the accompanying drawings in which.

Figure 1:
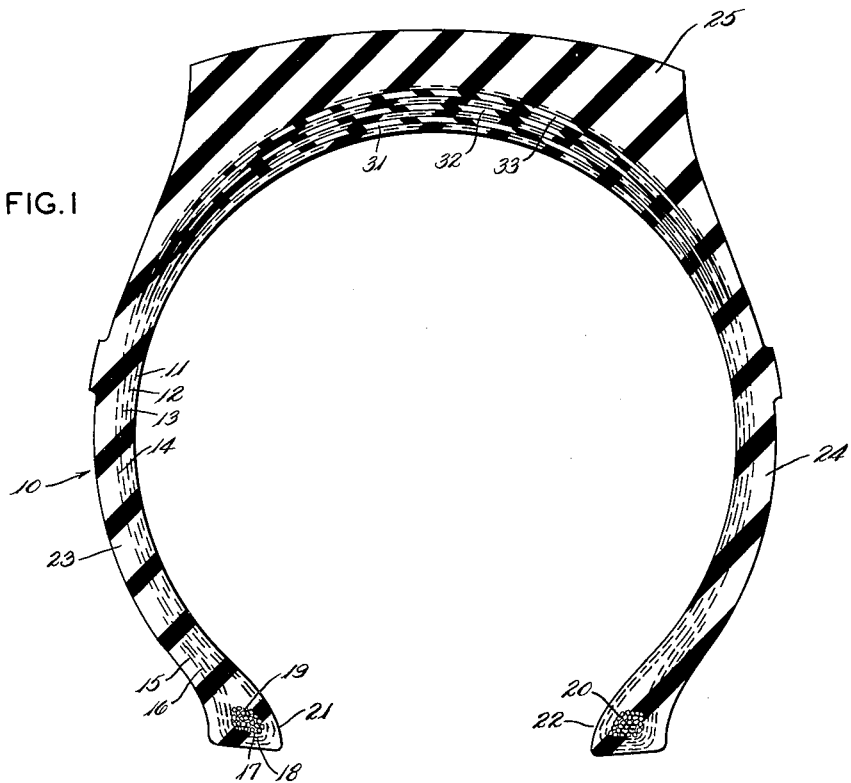
Figure 1 is a sectional view taken in a radial plane of a tire embodying the present invention.

The invention is described, by way of example, in connection with an otherwise conventional pneumatic passenger tire indicated generally at 10 in the drawings. Such a tire, as shown in Figure 1, usually comprises a body of four plies 11, 12, 13 and 14 of rubberized, essentially weftless fabric. The edges 15—18 of the plies, respectively, are turned about and anchored to the wire bundles 19 and 20 which form the inextensible portions of the tire beads 21 and 22. The tire is completed by the sidewalls 23 and 24 and by the tread 25.

In order to lend stability to the tire, the warp cords of the body plies extend at an angle of about 54° to the axis of the tire and the cords of each ply extend at opposite angles to the cords of adjacent plies. Although in the present example, four body plies are shown, it is to be understood that the invention can be used with equal advantage in tires having any suitable number of plies. Also, in the present example, the individual twisted cords making up the body plies are of rayon and have a 1650/2 construction, but the invention can be applied equally well in tires having cords of other material such as cotton or the other synthetic fibers such as nylon, dacron and the like. The invention is likewise as useful with monofilaments as with twisted cords and also with metal wires and cables.

When the tire is inflated, it expands until the force of the inflationary air is balanced by the tension in the cords of the body plies, since the rubber portions of the tire do not serve to resist the inflationary pressures to an appreciable extent. The individual cords 30 of the body plies are therefore each under an average tension of about 2-3 pounds and as a result each cord strives to shorten its length and relieve itself of such tension. In a conventional tire construction, the cords 30 cannot readily shorten their lengths because they are buttressed in the tire by the relatively hard supporting rubber which normally surrounds the cords.

According to the present invention, however, provision is made to enable the cords 30 to shorten their lengths by an amount approximately proportional to the tension originally imposed upon it. This is done by providing flat annular rings 31, 32, 33 and 34 of relatively soft rubber which are positioned respectively, adjacent to and just inwardly of the body plies at the crown of the tire. The hardness of the flat rings is preferably in the range of about 40 durometer, the required resiliency being obtained with stocks which vary somewhat in hardness. This hardness of approximately 40 durometer is still substantially softer than the tread and sidewall stock which in a conventional tire have hardnesses in the ranges of 57–60 and 50–60, respectively. The hardness, however, is not so important as the resiliency of the material. Preferably the rings are partly or fully cured before they are built into the tire so that they can withstand the molding pressures. In the present example, the rings in the vulcanized tire are about 1/16 inch thick and their annular edges are tapered as shown to eliminate abrupt changes in section.

Figure 2:
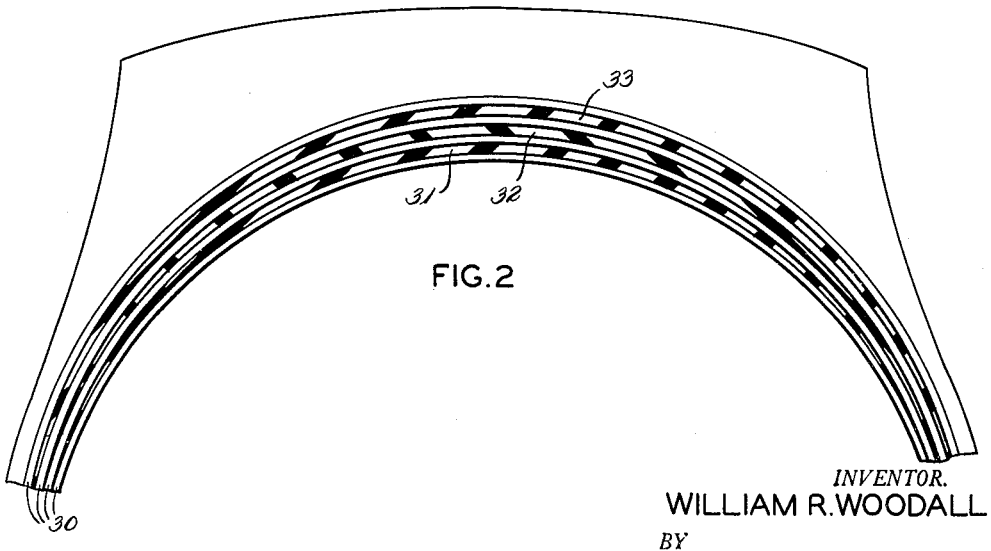
Figure 2 is a fragmentary view of the crown portion of the tire of Figure 1 which is somewhat diagrammatic in character to show the manner in which the tire cords "bite" into the cushion members and relieve themselves of tension.

When the tire is inflated and cords 30 are placed under tension, they will tend to pull inwardly and to embed themselves slightly in the rings, see Figure 2. The cords which are under the greatest tensions will pull inwardly more deeply into the resilient rings than the cords having lesser tension. The result is that the cords tending originally to be under more tension will shorten their effective lengths and a relatively short time after the tire is first inflated, the rubber rings will have enabled the cords to equalize their tensions.

As a result of such tension-equalizing rings, the cords of the tire will impart shocks of equal amplitude to the vehicle as they pass through the footprint and such tires are remarkably free from that objectionable ride characteristic known as "thump," and are otherwise quieter in operation than tires of conventional construction. The tension-regulating elements do not introduce any appreciable difficulty in tire manufacture or in the performance of the tire in other respects and they ae remarkably effective in producing the desired results.

Various modifications of the present invention will no doubt suggest themselves to those skilled in the art without departing from the scope of the invention, the essential features of which are summarized in the appended claim.

I claim:

A vulcanized pneumatic tire of substantially circular cross-section having a body comprising a plurality of rubberized plies extending from bead to bead, said plies comprising strain elements having their ends wrapped about and anchored to inextensible bead core members, and annular pads of substantially equal width separating all said rubberized plies, said pads extending under the tread and terminating in tapered edges at the shoulders of said tire, said pads comprising rubbery members which have been at least partially vulcanized prior to assembly into said tire, whereby said elements embed themselves in said pads to a depth corresponding to the tension on said elements when said tire is inflated.

References Cited in the file of this patent

UNITED STATES PATENTS

| Number | Name | Date |
|---|---|---|
| 1,213,476 | Gray | Jan. 23, 1917 |
| 1,530,574 | Paull | Mar. 24, 1925 |
| 1,575,966 | Brittain | Mar. 9, 1926 |
| 1,987,350 | Reel | Jan. 8, 1935 |
| 2,006,315 | Hopkinson | June 25, 1935 |
| 2,348,350 | McKelvey | May 9, 1944 |
| 2,452,998 | Cuthbertson | Nov. 2, 1948 |
| 2,645,265 | O'Neil | July 14, 1953 |

FOREIGN PATENTS

| Number | Country | Date |
|---|---|---|
| 187,149 | Great Britain | Oct. 19, 1922 |
| 1,076,572 | France | Apr. 21, 1954 |